(12) United States Patent
Jung et al.

(10) Patent No.: US 9,419,754 B2
(45) Date of Patent: Aug. 16, 2016

(54) TERMINAL AND RESOURCE SCHEDULING METHOD THEREOF

(75) Inventors: Jungsoo Jung, Seongnam-si (KR); Youngyong Kim, Seoul (KR); Woojin Ahn, Seoul (KR); Kyoungmin Park, Busan (KR)

(73) Assignees: Samsung Electronics Co., Ltd., Suwon-si (KR); Industry-Academic Cooperation Foundation, Yonsei University, Seoul (KR)

(*) Notice: Subject to any disclaimer, the term of this patent is extended or adjusted under 35 U.S.C. 154(b) by 3 days.

(21) Appl. No.: 13/459,461

(22) Filed: Apr. 30, 2012

(65) Prior Publication Data

US 2012/0275404 A1    Nov. 1, 2012

(30) Foreign Application Priority Data

Apr. 29, 2011    (KR) .......................... 10-2011-0041044

(51) Int. Cl.
*H04W 4/00* (2009.01)
*H04L 1/18* (2006.01)

(52) U.S. Cl.
CPC .................................... *H04L 1/1854* (2013.01)

(58) Field of Classification Search
CPC ..................................................... H04L 1/1854
USPC .................................................. 370/328–336
See application file for complete search history.

(56) References Cited

U.S. PATENT DOCUMENTS

| | | | | |
|---|---|---|---|---|
| 6,819,930 B1* | 11/2004 | Laroia | ................... | H04W 72/14 370/329 |
| 7,489,691 B2* | 2/2009 | Wigard | ...................... | H04L 1/16 370/230.1 |
| 7,894,822 B2* | 2/2011 | Jonsson | ................ | H04L 1/0019 370/310 |
| 8,068,868 B2* | 11/2011 | Chen | ................... | H04W 52/221 455/127.1 |
| 8,233,431 B2* | 7/2012 | Pirskanen | ............. | H04L 1/0007 370/328 |
| 8,279,756 B2* | 10/2012 | Yamazaki | ............... | H04L 1/187 370/232 |
| 8,351,380 B2* | 1/2013 | Kim | ...................... | H04L 1/1685 370/329 |

(Continued)

*Primary Examiner* — Khaled Kassim
*Assistant Examiner* — Berhanu Belete
(74) *Attorney, Agent, or Firm* — Jefferson IP Law, LLP (57) ABSTRACT

A terminal and a resource scheduling method for transmitting ACKnowledgements (ACKs) corresponding to the data received from a base station efficiently are provided. The method includes calculating, when a period arrives for feedback of ACKs corresponding to received segments, a fluctuation level based on variation of a segment transmission amount, determining whether the fluctuation level is greater than a scheduling threshold, and scheduling, when the fluctuation level is greater than the scheduling threshold, ACKs accumulated in the terminal. The terminal and the method are capable of reducing the probability of an occurrence of a spurious timeout, at a Transmission Control Protocol (TCP) sender, caused by radio channel fluctuation and scheduling delay.

4 Claims, 8 Drawing Sheets

(56) References Cited

U.S. PATENT DOCUMENTS

| | | | |
|---|---|---|---|
| 2003/0095535 A1* | 5/2003 | Le | H04L 29/06 370/349 |
| 2005/0005207 A1* | 1/2005 | Herneque | H04L 47/10 714/712 |
| 2006/0034285 A1* | 2/2006 | Pirskanen | H04L 1/0007 370/394 |
| 2006/0067222 A1* | 3/2006 | Endoh | H04L 69/163 370/231 |
| 2006/0104313 A1* | 5/2006 | Haner | H04L 47/10 370/517 |
| 2006/0176862 A1* | 8/2006 | Ishimori | H04L 1/1848 370/338 |
| 2006/0184664 A1* | 8/2006 | Jung | H04L 47/10 709/224 |
| 2007/0081513 A1* | 4/2007 | Torsner | H04W 72/1242 370/349 |
| 2007/0121506 A1* | 5/2007 | Wydrowski | H04L 1/1874 370/231 |
| 2007/0159985 A1* | 7/2007 | Sunell | H04L 1/1628 370/254 |
| 2007/0217390 A1* | 9/2007 | Laroia | H04W 72/14 370/350 |
| 2007/0249360 A1* | 10/2007 | Das | H04L 47/10 455/450 |
| 2007/0280115 A1* | 12/2007 | Meyer | H04L 47/10 370/236 |
| 2008/0062875 A1* | 3/2008 | Yamazaki | H04L 1/187 370/232 |
| 2008/0081635 A1* | 4/2008 | Jonsson | H04L 1/0019 455/452.2 |
| 2008/0081651 A1* | 4/2008 | Kuroda | H04L 1/1829 455/509 |
| 2008/0119180 A1* | 5/2008 | Small | H04L 12/2602 455/422.1 |
| 2008/0137618 A1* | 6/2008 | Sung | H04L 69/16 370/336 |
| 2008/0144509 A1* | 6/2008 | Chan | H04L 47/10 370/235 |
| 2008/0181150 A1* | 7/2008 | Won | H04L 12/5693 370/310 |
| 2008/0267168 A1* | 10/2008 | Cai | H04L 1/0003 370/352 |
| 2009/0147869 A1* | 6/2009 | Duan | H04L 1/0026 375/260 |
| 2009/0285160 A1* | 11/2009 | Cheng | H04L 1/1854 370/328 |
| 2009/0323577 A1* | 12/2009 | Agrawal | H04L 1/0026 370/312 |
| 2010/0008223 A1* | 1/2010 | Messing | H04L 1/1825 370/231 |
| 2010/0011270 A1* | 1/2010 | Yamamoto | H04L 47/10 714/748 |
| 2010/0035625 A1* | 2/2010 | Damnjanovic | H04W 72/00 455/450 |
| 2010/0098006 A1* | 4/2010 | Golitschek | H04L 1/1861 370/329 |
| 2010/0202420 A1* | 8/2010 | Jersenius | H04L 47/10 370/337 |
| 2010/0296470 A1* | 11/2010 | Heo | H04W 52/365 370/329 |
| 2011/0038264 A1* | 2/2011 | Ishii | H04L 47/10 370/238 |
| 2011/0158186 A1* | 6/2011 | Shihab | H04L 1/1854 370/329 |
| 2011/0159799 A1* | 6/2011 | Chen | H04L 1/1867 455/3.01 |
| 2011/0159911 A1* | 6/2011 | Chen | H04W 52/221 455/522 |
| 2011/0239073 A1* | 9/2011 | Imai | H04L 1/188 714/748 |
| 2011/0243016 A1* | 10/2011 | Zhang | H04W 52/365 370/252 |
| 2012/0014425 A1* | 1/2012 | Zhuang | H04L 1/0015 375/224 |
| 2012/0054330 A1* | 3/2012 | Loach | H04L 47/17 709/224 |
| 2012/0147831 A1* | 6/2012 | Golitschek | H04L 1/0026 370/329 |

* cited by examiner

TERMINAL AND RESOURCE SCHEDULING METHOD THEREOF

PRIORITY

This application claims the benefit under 35 U.S.C. §119(a) of a Korean patent application filed on Apr. 29, 2011 in the Korean Intellectual Property Office and assigned Serial No. 10-2011-0041044, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) SAMSUNG ELECTRONICS CO., LTD. and 2) INDUSTRY-ACADEMIC COOPERATION FOUNDATION, YONSEI UNIVERSITY.

BACKGROUND OF THE INVENTION

1. Field of the Invention

The present invention relates to resource scheduling. More particularly, the present invention relates to a terminal and resource scheduling thereof for transmitting an ACKnowledgement (ACK) corresponding to data received from a base station.

2. Description of the Related Art

Transmission Control Protocol (TCP) has been developed to efficiently use limited bandwidth by adjusting a transmission rate of a sender and prevent a network from being overloaded. In TCP, the sender checks a Round Trip Time (RTT) based on a Packet Sequence Number (PSN) of the transferred packet and an ACKnowledgement (ACK) received in response to the packet. The sender increases the size of a congestion window to increment a number of packets using congestion control techniques such as slow start and congestion avoidance for a low network congestion situation. However, when a router experiences high network congestion and thus packet loss occurs, the sender decreases the size of the congestion window to reduce the transmission rate using techniques such as time-out and window halving.

Since TCP is designed for a wired network environment, it causes performance degradation to adopt TCP to a wireless communication environment without consideration of the characteristics of the wireless communication. In the wired communication environment, the packet loss caused by a packet error or a router buffer overflow is the main reason for the time-out or window halving. However, in a case where a wireless network is added to an end-user node, the resource distribution for sharing limited resources among multiple terminals increases the latency as compared to the wired network environment. If the channel condition gets worse, it may not be possible to transmit a large amount of data, regardless of the resource distribution.

In this case, although no packet loss has actually occurred, the delay spike in the wireless environment causes an unnecessary time-out (i.e., spurious time-out). That is, although the ACK arrives at the base station with long RTT, the sender makes a time-out decision so as to unnecessarily reduce the size of the congestion window. Although it may be controlled partially with the basic function of TCP, the probability of the spurious time-out increases significantly when the terminal's mobility or channel fluctuation increases.

SUMMARY OF THE INVENTION

Aspects of the present invention address at least the above-mentioned problems and/or disadvantages and to provide at least the advantages described below. Accordingly, an aspect of the present invention is to provide a terminal and resource scheduling method thereof that is capable of reducing the probability of an occurrence of a spurious timeout, at the Transmission Control Protocol (TCP) sender, caused by radio channel fluctuation and scheduling delay.

According to an aspect of the present invention, a resource scheduling method of a terminal is provided. The method includes calculating, when a period arrives for feedback of ACKnowledgements (ACKs) corresponding to received segments, a fluctuation level based on variation of a segment transmission amount; determining whether the fluctuation level is greater than a scheduling threshold; and scheduling, when the fluctuation level is greater than the scheduling threshold, ACKs accumulated in the terminal.

According to another aspect of the present invention, a terminal for scheduling resource is provided. The terminal includes a fluctuation level calculator which calculates, when a period arrives for feedback of ACKs corresponding to received segments, a fluctuation level based on variation of segment transmission amount; and an ACK scheduler which determines whether the fluctuation level is greater than a scheduling threshold and scheduling, when the fluctuation level is greater than the scheduling threshold, ACKs accumulated in the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Delay injection is a method for injecting a certain length of delay at an interval when transmitting an ACKnowledgement (ACK). The retransmission timer (RTO) of a Transmission Control Protocol (TCP) sender is determined as a sum of a smoothed average and mean deviation of a Round Trip Time (RTT) based on the arrivals of ACKs received in sequence. Since the increase amount of the RTO based on the mean deviation is large, the sender generates a small deviation to an allowable extent so as to secure a relatively large RTO value. The delay injection method can be categorized into one of Fixed Time-Fixed Delay (FTFD), Random Time-Fixed Delay (FTRD), Fixed Time-Random Delay (FTRD) and Random Time-Random Delay depending on the delay injection timing and randomness of the delay amount.

Exemplary embodiments of the present invention may enable an ACK to be transmitted in adaptation to the radio environment so as to minimize an unnecessary waste of bandwidth using the delay injection technique. In the present exemplary embodiments, the terminal may determine the detailed delay injection timing and delay value based on the channel fluctuation level and Segment Arrival Rate (SAR) and ACK Departure Rate (ADR) at a previous time point. The present exemplary embodiments are advantageous in that the technical implementation is focused on the terminal without modification of the TCP standard of the related art.

The present exemplary embodiments are composed of two parts. The first part is a procedure for the TCP receiver to increase delay gradually so as to increase the RTO of the TCP sender. In this procedure, the channel fluctuation level is used to determine a ramping factor r with which a formula increases the delay gradually. If a delay is injected in ACK transmission, the sender increases the RTO by reflecting the increased RTT. Since the delay is injected in a gradual ramping-up manner, it is possible to minimize the probability of timeout caused by the delay injection.

The second part is a procedure for accumulating and consuming the ACKs delayed due to the delay injection in order to regulate the ACK transmission interval of the TCP receiver. Due to the ACK transmission delay, the transmission-ready ACKs are accumulated in the terminal buffer. If the channel quality becomes worse due to channel fluctuation and thus the SAR decreases dramatically, the terminal may maintain the RTT by transmitting the ACK at an interval similar to the previous one using the accumulated spare ACKs. Otherwise, if the SAR increases as the channel quality improves, the terminal may maintain the ADR at a level similar to the previous one in consideration of the channel fluctuation level without an immediate increase of the ADR so as to accumulate the spare ACKs.

Figure 1:
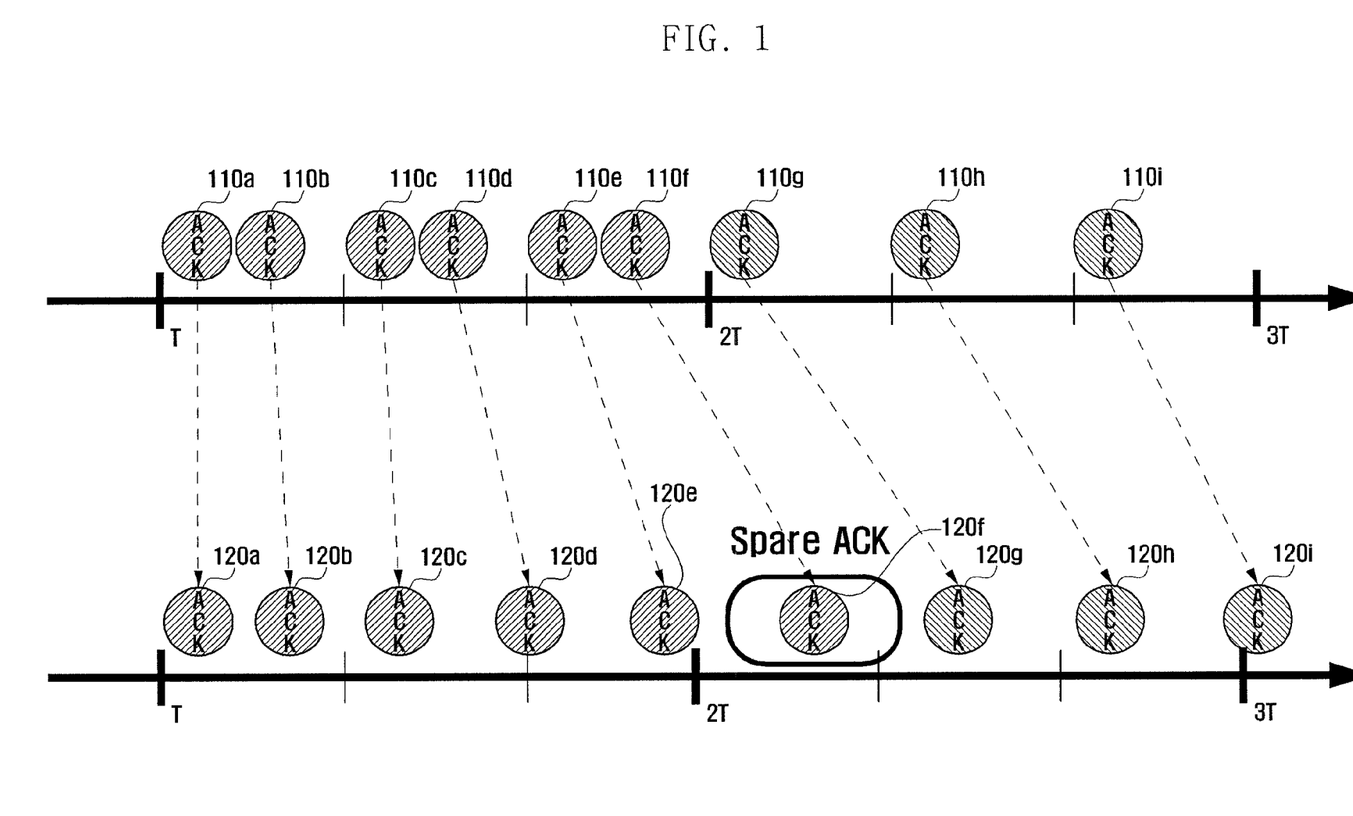
FIG. 1 is a diagram illustrating a principle of ACKnowledgement (ACK) accumulation in an ACK transmission method according to an exemplary embodiment of the present invention.

FIG. 1 is a diagram illustrating a principle of ACK accumulation in an ACK transmission method according to an exemplary embodiment of the present invention.

Referring to FIG. 1, in a network where Channel Quality Indicator (CQI) feedback is performed at a period T to feed back the ACK corresponding to the received segment between a base station and a terminal, if the number of transmission segments is reduced by half due to the channel quality reduction since the time point 2 T, the ACK transmission interval may increase by two times after 2 T. For example, six ACKs 110a, 110b, 110c, 110d, 110e, and 110f are transmitted during the first T period and three ACKs 110g, 110h, and 110i during the second T period.

In this case, if the terminal injects a delay in ACK transmission, the final ACK 120f remains in the buffer of the terminal among the ACKs 120a, 120b, 120c, 120d, 120e, and 120f within the period T. This transmission-delayed ACK may be used as a spare ACK. Accordingly, even when the number of segments received after the time point 2 T decreases (see ACKs 120g, 102h, and 120i), the terminal may maintain the ACK transmission interval so as to be similar to the previous period by using the spare ACK 120f accumulated during the previous period T. The spare ACK accumulation and transmission procedure operate in a unit of a CQI feedback period and is triggered by the terminal when the resource allocation and segment transmission amount variance according to the CQI feedback is equal to or greater than a predetermined value.

The spare ACK accumulation with ACK delay in adaptation to the channel quality is performed as follows.

The terminal retains the segment transmission amount information (a) on the k previous periods. The segment transmission amount is determined as a number of TCP segments received in the period T. Assuming that the segment transmission amounts of the two periods right before the start time of the current period nT are $a_{nT}$, and $a_{(n-1)T}$, the rate of change of the segment transmission amount is calculated with Equation (1).

$$\frac{\max(a_{nT}, a_{(n-1)T})}{\min(a_{nT}, a_{(n-1)T})} \quad \text{Equation (1)}$$

The fluctuation level at time point nT is calculated with Equation (2) by obtaining the segment transmission amount displacement in the k previous periods in the form of a product of the segment transmission amount change rates calculated with Equation (2).

$$A_{nT} = \frac{\max(a_{nT}, a_{(n-1)T})}{\min(a_{nT}, a_{(n-1)T})} E \frac{\max(a_{(n-1)T}, a_{(n-2)T})}{\min(a_{(n-1)T}, a_{(n-2)T})}$$
$$E \ldots E \frac{\max(a_{(n-k+2)T}, a_{(n-k+1)T})}{\min(a_{(n-k+2)T}, a_{(n-k+1)T})} \quad (1, \wedge)$$

Equation (2)

In Equation (2), n is a value in the range between 1 and ^. The terminal determines whether the fluctuation level $A_{nT}$ is greater than the scheduling threshold value THA for scheduling with the spare ACK accumulation. If the fluctuation level is greater than the scheduling threshold value, the terminal accumulates the spare ACKs and performs ACK scheduling with the accumulated spare ACKs. For this purpose, the terminal calculates a scheduling control value (i.e., delay control value) d based on the fluctuation level $A_{nT}$ with Equation (3).

$$d = \left(\frac{1}{A_{nT}}\right)^{1/ck} \quad (0, 1), (c : \text{scaling factor})$$

Equation (3)

In Equation (3), d is a value between 0 and 1. If d is calculated, the terminal predicts that the SAR decreases by d in the periods after the current time point. That is, assuming that the ADR of the final period at nT is defined as ADR(nT), the terminal may define the numbers of segments predicted to be received in the next two periods as dETEADR(nT), $d^2$ETEADR(nT). The terminal also calculates the ACK transmission interval increasing in a ramping-up manner for the ACKs corresponding to the dETEADR(nT)+$d^2$ETEADR(nT)=N segments received for two periods with Equation (4).

$$interval^1 = d / ADR(nT)$$

Equation (4)

$$interval^2 = \text{delay} + interval^1 = \text{delay} + d / ADR(nT)$$
$$interval^3 = \text{delay} + interval^2 = 2E\text{delay} + d / ADR(nT)$$
$$\ldots$$
$$interval^N = (N-1)\text{delay} +$$
$$d / ADR(nT)(N = dETEADR(nT) + d^2ETEADR(nT)$$
$$interval^1 + interval^2 + \ldots + interval^N = 2T$$
$$\text{delay} = \frac{4T - 2NEd / ADR(nT)}{N(N-1)}$$

The terminal may predict the number of segments received in the course of decreasing in the next two periods using the SAR of the last period and fluctuation level. The terminal performs the delay injection using the delay value calculated with Equation (4). That is, the terminal calculates the ACK transmission interval using the delay value and schedules the transmission timing of each segment according to the calculated ACK transmission interval.

If the number of the arrived segments is equal to or greater than the predicted number of segments, the terminal transmits ACKs by injecting the delay at the segment arrival timing as scheduled. By injecting delay in this way, the terminal may increase the occupancy rate of the spare ACK queue. Otherwise, if the number of the arrived segments is less than the predicted number of segments such that the ACK scheduling does not match, the terminal transmits the ACK immediately upon receipt of the corresponding segment.

Afterward, the terminal may adapt the ACK scheduling method to the buffer state storing the spare ACKs so as to adjust the accumulated amount of the spare ACKs. The spare ACK accumulation amount may be expressed as a number of ACKs queued in the buffer or a ratio of the ACKs queued in the buffer to the number of ACKs scheduled to be transmitted. Here, the description is made under the assumption that the spare ACK accumulation amount is the ratio of the ACKs retained in the buffer to the number of ACKs scheduled to be transmitted.

The accumulated spare ACK amount (i.e., occupancy) is less than a low threshold (THq.low) (e.g., 0.2) set as the minimum ACK occupancy, the terminal accumulates the spare ACKs while increasing the ACK transmission interval gradually based on the ADR and ADR level updated periodically.

If the spare ACK occupancy is greater than the low threshold, the terminal performs an ADR control process. In the ADR control process, the terminal compares the SAR and ADR of the previous period with each other to analyze the spare ACK consumption and accumulation levels and adjusts the ACK transmission interval in the next period according to a result of the analysis.

If the spare ACK accumulation amount (i.e., queue occupancy) is equal to or greater than an accumulation maintenance threshold value THq.middle set to maintain the predetermined spare ACK amount and if the spare ACK accumulation amount is less than a maximum accumulation threshold (i.e., upper threshold) THq.up, the terminal may determine that the spare ACK accumulation amount is high or low. The terminal aims at maintaining the ADR as high as possible even when the SAR varies abruptly. Accordingly, the terminal transmits ACKs at the same ACK transmission interval (=1/ADR) according to the ADR in the previous period. If the SAR is greater than the ADR at the period end time point, this means that the number of the segments that arrived is greater than the number of the transmitted ACKs, resulting in a greater accumulation of ACKs; and otherwise, if the SAR is less than the ADR, this means that the number of the transmitted ACKs is greater than the number of the segments that arrived, resulting in a greater consumption of the spare ACKs.

If the spare ACK accumulation amount is greater than the maximum accumulation threshold, this means that the ADR is set lower than it should be or that the channel quality increases gradually so as to consume the spare ACKs. At this time, it may be preferred to set the maximum accumulation threshold to 0.8. In this case, the terminal operates to increase the ADR.

If the SAR is less than the ADR in the previous period, this means that the spare ACKs run short such that the terminal transmits the ACKs at the same interval (=1/ADR) as the previous period. Otherwise, if the SAR is greater than the ADR, this means that the spare ACKs are accumulated such that the terminal sets the ACK transmission interval (=1/SAR) according to the SAR in the previous period to consume the spare ACKs more quickly. The ACK consumption process is repeated until the spare ACK accumulation amount falls below an accumulation maintenance threshold. At this time, it may be preferred to set the accumulation maintenance threshold to 0.5.

Figure 2:
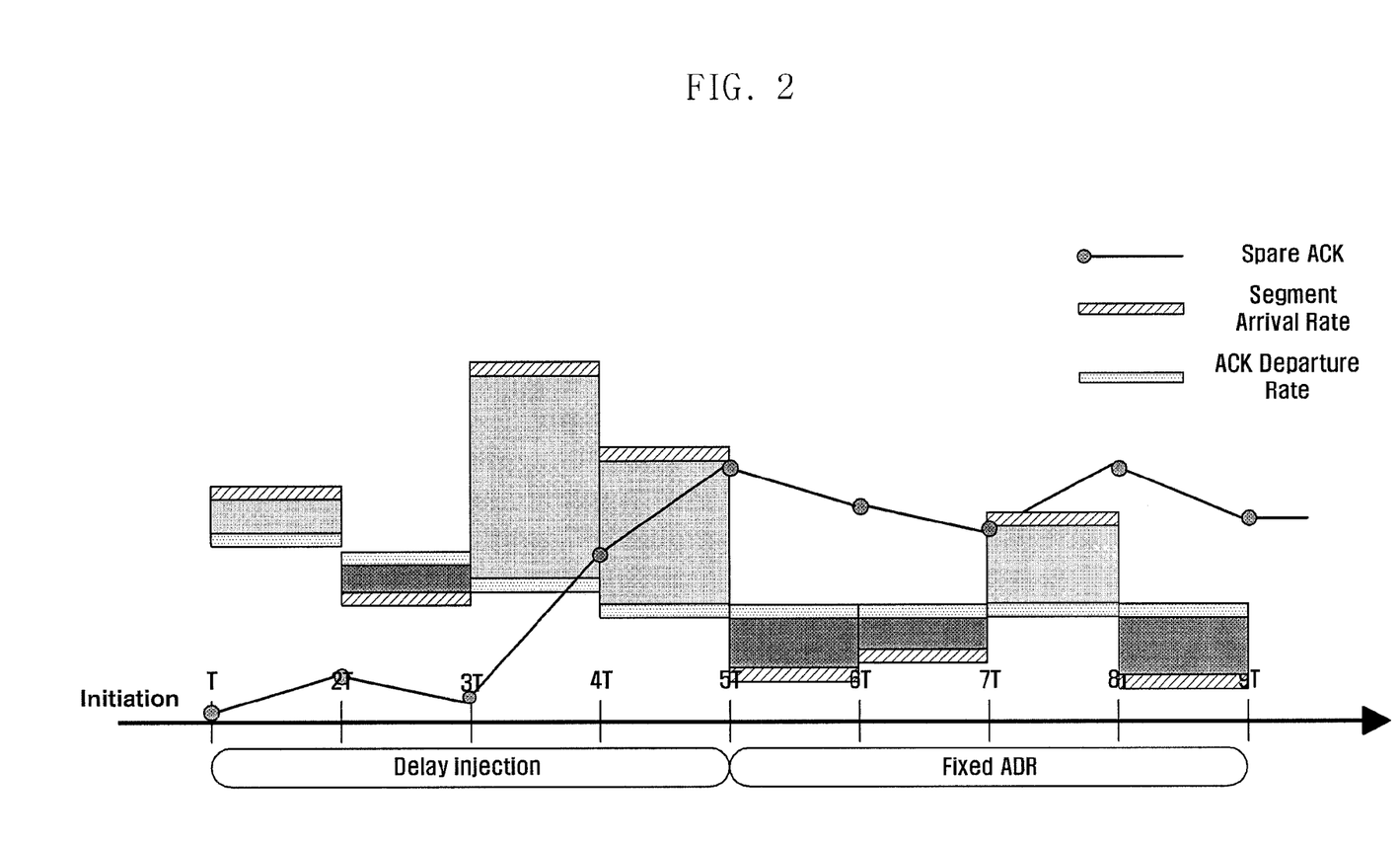
FIG. 2 is a diagram illustrating a principle of ACK transmission interval adjustment in an ACK transmission method according to an exemplary embodiment of the present invention.

Through this procedure, the terminal can regulate the ACK transmission interval according to the spare ACK accumulation amount. That is, the terminal can adjust the ACK transmission interval based on the SAR and ADR as shown in FIG. 2. It is noted that the lower accumulation threshold, accumulation maintenance threshold, and upper accumulation threshold may be changed according to the communication environment and simulation environment of the terminal.

FIG. 2 is a diagram illustrating a principle of ACK transmission interval adjustment in an ACK transmission method according to an exemplary embodiment of the present invention.

Referring to FIG. 2, the time duration (T, 5 T) is the delay injection duration for which a delay is injected in ACK transmission so as to decrease the ADR gradually. Afterward, if the spare ACK accumulation amount is equal to or greater than the lower accumulation threshold, the terminal enters the ADR control stage for controlling the ACK transmission interval. In the duration (5 T, 9 T), accordingly, the terminal transmits the ACKs at an interval with the fixed ADR of the duration (4 T, 5 T) while consuming or accumulating the spare ACKs regardless of the SAR.

Figure 3:
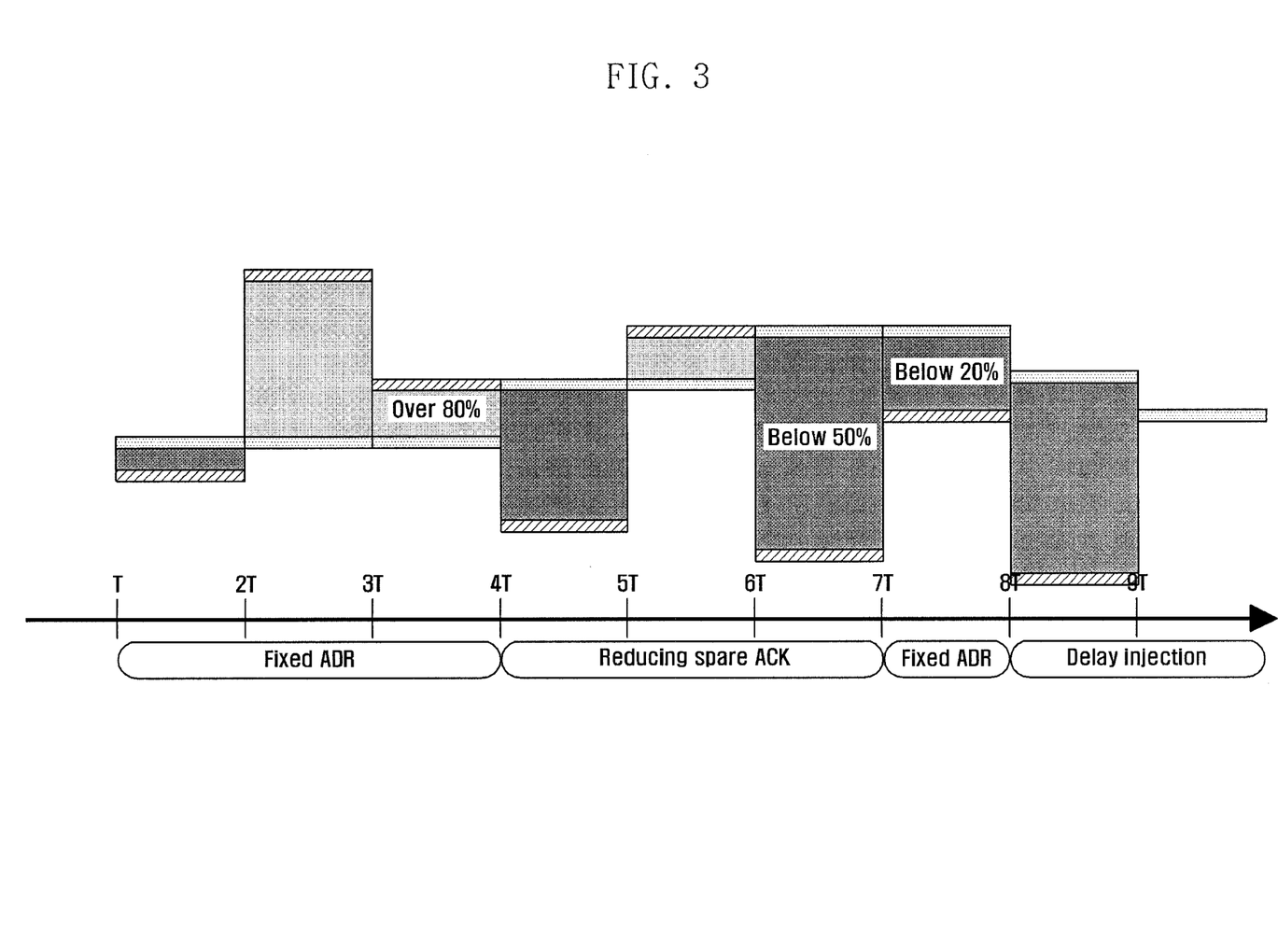
FIG. 3 is a diagram illustrating ACK accumulation in an ACK transmission method according to an exemplary embodiment of the present invention.

FIG. 3 is a diagram illustrating ACK accumulation in an ACK transmission method according to an exemplary embodiment of the present invention.

Referring to FIG. 3, the ACK accumulation amount becomes greater than the upper accumulation threshold at time point 4 T such that the terminal enters the spare ACK reduction stage. Since the SAR is greater than the ADR for the period (3 T, 4 T), the terminal configures the ACK transmission interval for the period (4 T, 5 T) based on the SAR rather than the ADR of the previous period (interval=1/(SAR(3 T, 4 T)). Likewise, since the SAR is greater than the ADR for the period (5 T, 6 T) at time point 6 T, the terminal increases the ADR by referencing the previous SAR. If the accumulation amount falls so as to be below 50% as the accumulation maintenance threshold by consuming enough spare ACKs at time point 7 T, the terminal enters the fixed ADR stage to control the ACK transmission interval according to the ADR of the previous period. If the spare ACK accumulation amount is less than the lower accumulation threshold at time point 8 T, the terminal calculates a scheduling control value and transmission interval according to the scheduling control value and enters a delay injection stage for controlling the ACK transmission interval so as to operate to accumulate the spare ACKs while reducing the ADR.

The method for adjusting the accumulated spare ACK transmission interval based on the SAR and ADR and scheduling of the ACKs has been described above. More detailed descriptions are provided hereinafter with reference to FIGS. 4 to 8.

Figure 4:
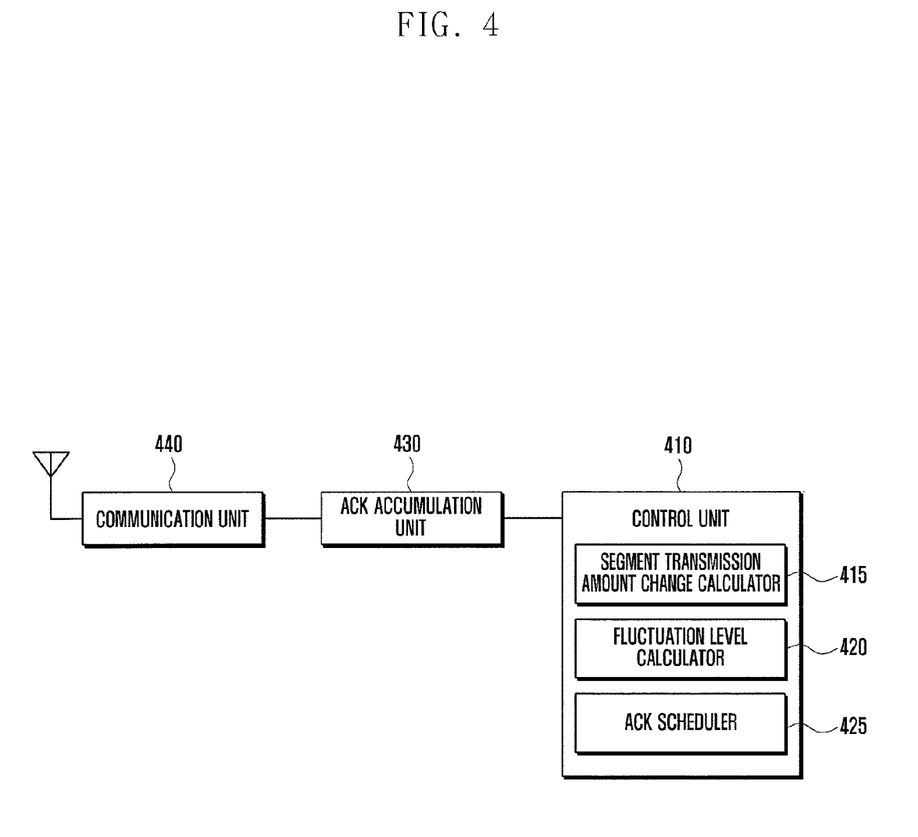
FIG. 4 is a block diagram illustrating a configuration of a terminal according to an exemplary embodiment of the present invention.

FIG. 4 is a block diagram illustrating a configuration of a terminal according to an exemplary embodiment of the present invention.

As shown in FIG. 4, the terminal includes a control unit 401, an ACK accumulation unit 430, and a communication unit 440. The control unit 401 includes a segment transmission amount change calculator 415, a fluctuation level calculator 420, and an ACK scheduler 425 interoperating for ACK scheduling.

The control unit 410 controls the configurations and operations of the function blocks of the terminal. The control unit 410 may schedule ACKs according to the channel condition of the network in which CQI feedback takes place periodically. In more detail, when feeding back the CQI periodically, the control unit 410 checks the change rate of the segment transmission amount and injects a delay in ACK transmission based on the change rate. The control unit 410 stores the ACKs that are not transmitted during the current period in the ACK accumulation unit 430 in a buffer. The control unit 410 uses the ACKs stored in the ACK accumulation unit 430 as spare ACKs. The control unit 410 may schedule the ACKs according to the amount of the accumulated spare ACKs. In order to perform these processes, the control unit 410 includes a segment transmission amount change calculator 415, a fluctuation level calculator 420, and an ACK scheduler 425.

The segment transmission amount change calculator 415 calculates the segment transmission amount change displacement as a number of segments in a period. In more detail, the segment transmission amount change calculator 415 calculates the displacement based on the segment transmission amounts in the two previous periods with reference to the current period.

The fluctuation level calculator 420 calculates the fluctuation level at the current time point by obtaining the segment transmission amount displacement in the k previous periods in the form of a product of the segment transmission amount change rates calculated by the segment transmission amount change rate calculator 415. The fluctuation level calculator 420 determines whether the calculated fluctuation level is equal to or greater than the scheduling threshold value for scheduling the accumulated spare ACKs.

If the fluctuation level is equal to or greater than the scheduling threshold value, the ACK scheduler 425 calculates a scheduling control value d based on the fluctuation level. Afterward, at the start point of the new period, the ACK scheduler 425 predicts the reduction of the SAR by d at every time. The ACK scheduler 425 also calculates the ACK transmission interval incrementing in a ramping-up manner according to the calculated ACK transmission interval.

The ACK scheduler 425 also schedules the ACKs, in the state where the spare ACKs are queued in the buffer, so as to adjust the accumulation amount of the spare ACKs. For example, if the accumulation amount of the spare ACKs is less than the lower threshold value, the ACK scheduler 425 schedules the ACKs while increasing the ACK transmission interval based on the ADR and fluctuation level at the end of every period. In this case, the control unit 410 controls the ACK accumulator 430 to accumulate the ACKs not transmitted in the current period as spare ACKs.

If the accumulation amount of the spare ACKs is greater than the lower accumulation threshold value, the ACK scheduler 425 compares the SAR and ADR of the previous period with each other to analyze the spare ACK consumption and accumulation level and controls the ACK transmission interval of the next period based on a result of the analysis.

If the accumulation amount of the spare ACKs is equal to or greater than the accumulation maintenance threshold value and less than the upper accumulation threshold value, the ACK scheduler 425 schedules the ACKs such that the ADR is maintained as high as possible. Accordingly, the ACK scheduler 425 schedules the ACKs at the same ACK transmission interval fixed to the ADR of the previous period.

Meanwhile, if the accumulation amount of the spare ACKs is greater than the upper accumulation threshold value, the ACK scheduler 425 checks the SAR of the previous period. If the SAR of the previous period is less than the ADR this means that the ACK runs short such that the ACK scheduler 425 schedules the ACKs at the same interval (=1/ADR) as the previous period. Otherwise, if the SAR is equal to or greater than the ADR, this means that the spare ACKs are accumulated such that the ACK scheduler 425 schedules ACKs at the ACK transmission interval based on the SAR of the previous period to consume the spare ACKs more quickly.

If the accumulation amount of the spare ACKs is less than the lower accumulation threshold THq.low, i.e., if the channel quality degrades gradually to reduce the spare ACKs, the ACK scheduler 425 accumulates the spare ACKs by increasing the ACK transmission interval again.

The control unit 410 controls the communication unit 440 to transmit the ACKs as scheduled by the ACK scheduler 425. The control unit 410 also controls the ACK accumulator 430 to save the ACKs scheduled but not transmitted in the current period as the spare ACKs.

The ACK accumulator 430 saves the ACKs not transmitted in the current transmission period as the spare ACKs to be transmitted in the next transmission period.

The communication unit 440 is responsible for communicating data with an external terminal. The communication unit 440 may transmit the ACKs scheduled in correspondence to the received segments under the control of the control unit 410. That is, the communication unit 440 may transmit the ACKs at the ACK transmission interval as scheduled according to the fluctuation level calculated based on the channel quality under the control of the control unit 410.

Figure 5:
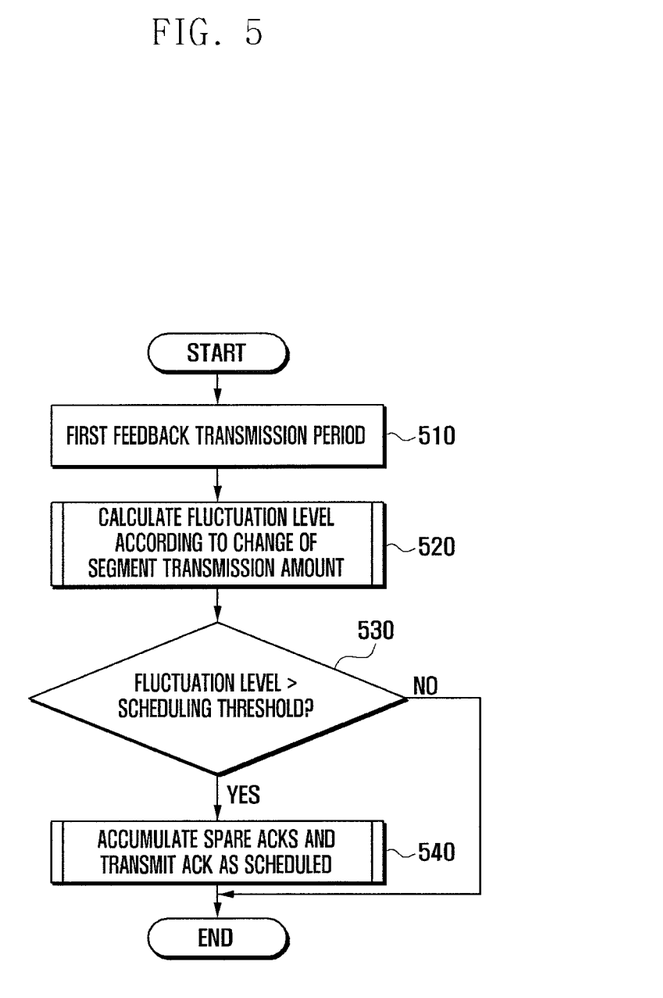
FIG. 5 is a flowchart illustrating an acknowledgement scheduling method according to an exemplary embodiment of the present invention.

FIG. 5 is a flowchart illustrating an acknowledgement scheduling method according to an exemplary embodiment of the present invention.

Referring to FIG. 5, the first feedback transmission period arrives for feedback of the ACK corresponding to a received segment at step 510. Upon arrival of the first feedback transmission period, the terminal calculates the fluctuation level based on the segment transmission amount variation at step 520. The fluctuation level calculation step is described in detail later with reference to FIG. 6.

The terminal determines whether the fluctuation level is greater than a scheduling threshold at step 530. If the fluctuation level is greater than the scheduling threshold, the terminal accumulates spare ACKs and transmits the ACKs as scheduled according to the accumulation amount of the spare ACKs at step 540. The spare ACK accumulation and scheduled ACK transmission are described in detail later with reference to FIGS. 7 and 8. Although not depicted in the drawings, if the fluctuation level falls below the scheduling threshold value, the base station notifies of the termination of spare ACK accumulation according to the delay injection.

Figure 6:
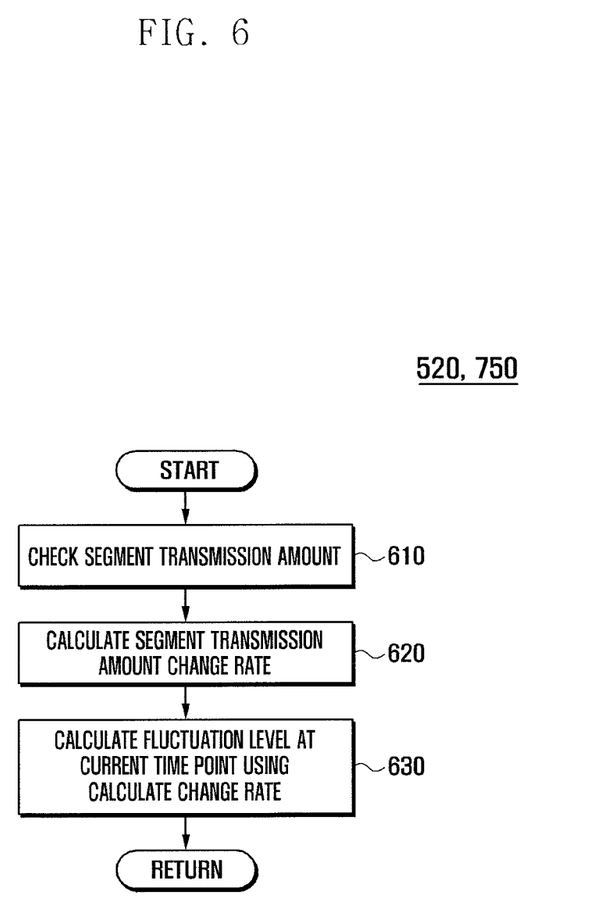
FIG. 6 is a flowchart illustrating a fluctuation level calculation procedure of an ACK transmission method according to an exemplary embodiment of the present invention.

FIG. 6 is a flowchart illustrating a fluctuation level calculation procedure of an ACK transmission method according to an exemplary embodiment of the present invention.

Referring to FIG. 6, the terminal checks the segment transmission amount information of the previous period at step 610. Next, the terminal calculates the segment transmission amount change rate using segment transmission amount information at step 620. Finally, the terminal calculates the fluctuation level at the current time point using the segment transmission amount change rate at step 630.

The terminal may compare the calculated fluctuation level with the scheduling threshold to accumulate spare ACKs and transmit the ACKs as scheduled according to the accumulated spare ACK amount.

Figure 7:
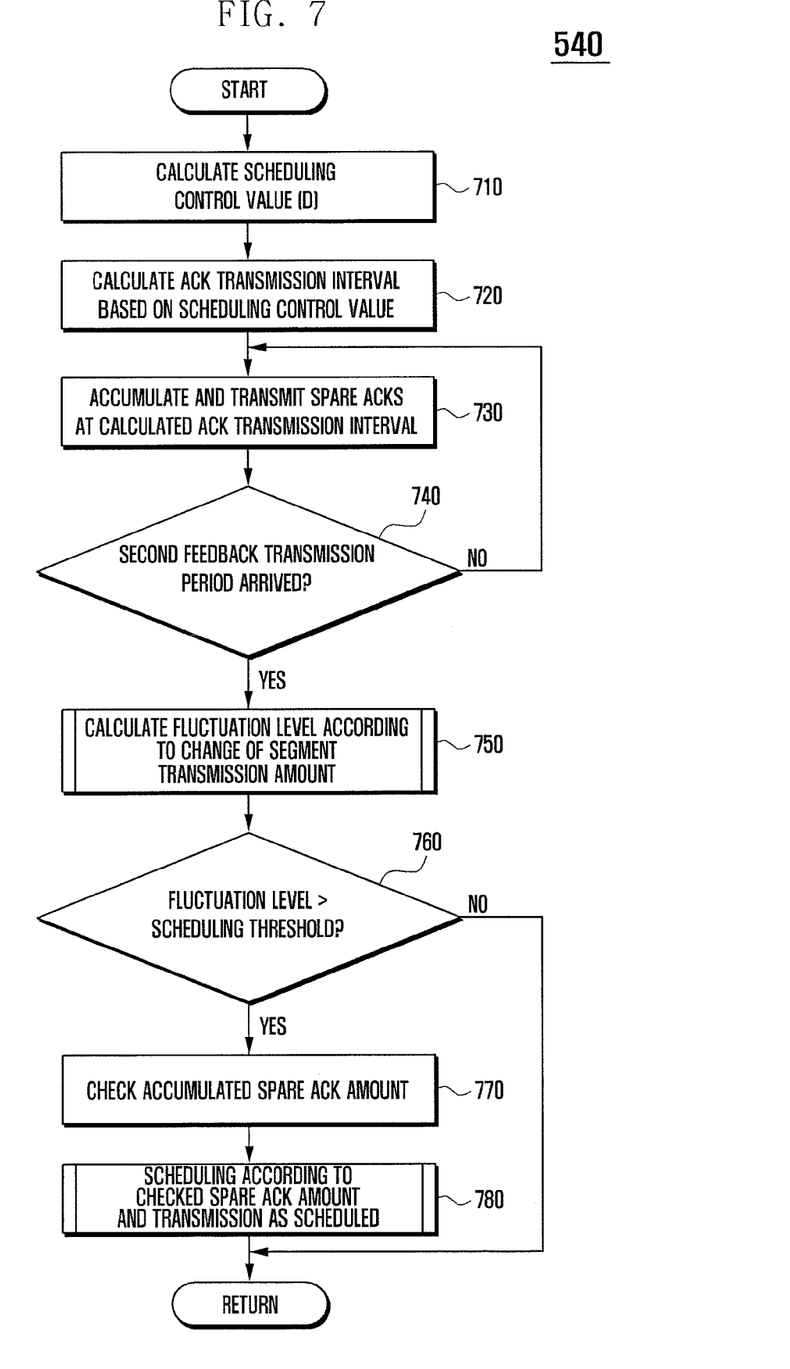
FIG. 7 is a flowchart illustrating a spare ACK accumulation procedure of an ACK transmission method according to an exemplary embodiment of the present invention.

FIG. 7 is a flowchart illustrating a spare ACK accumulation procedure of an ACK transmission method according to an exemplary embodiment of the present invention.

Referring to FIG. 7, if the fluctuation level is greater than the scheduling threshold, the terminal calculates the scheduling control value (d) at step 710. The terminal calculates the ACK transmission interval based on the scheduling control value at step 720. Next, the terminal transmits the ACKs at the ACK transmission interval and accumulates the ACKs not transmitted in the current period in the buffer as spare ACKs at step 730.

Next, the terminal determines whether the second feedback transmission period has arrived at step 740. If the second feedback transmission period has not arrived, the process returns to step 730. Otherwise, if the second feedback transmission period has arrived, the terminal calculates the fluctuation level according to the segment transmission amount change at step 750. Since the fluctuation level calculation procedure has been described with reference to FIG. 6, a detailed description thereof is omitted herein. Next, the terminal determines whether the fluctuation level is greater than the scheduling threshold at step 760.

If the fluctuation level is greater than the scheduling threshold value, the terminal checks the accumulation amount of the spare ACKs at step 770. The terminal schedules the ACKs in adaptation to the accumulation amount of the spare ACKs and transmits the ACKs as scheduled at step 780. The spare ACK amount-based ACK scheduling procedure is described later with reference to FIG. 8.

The terminal may schedule the ACKs to be transmitted in the next feedback transmission period depending on the accumulation amount of the spare ACKs. This is described with reference to FIG. 8.

Figure 8:
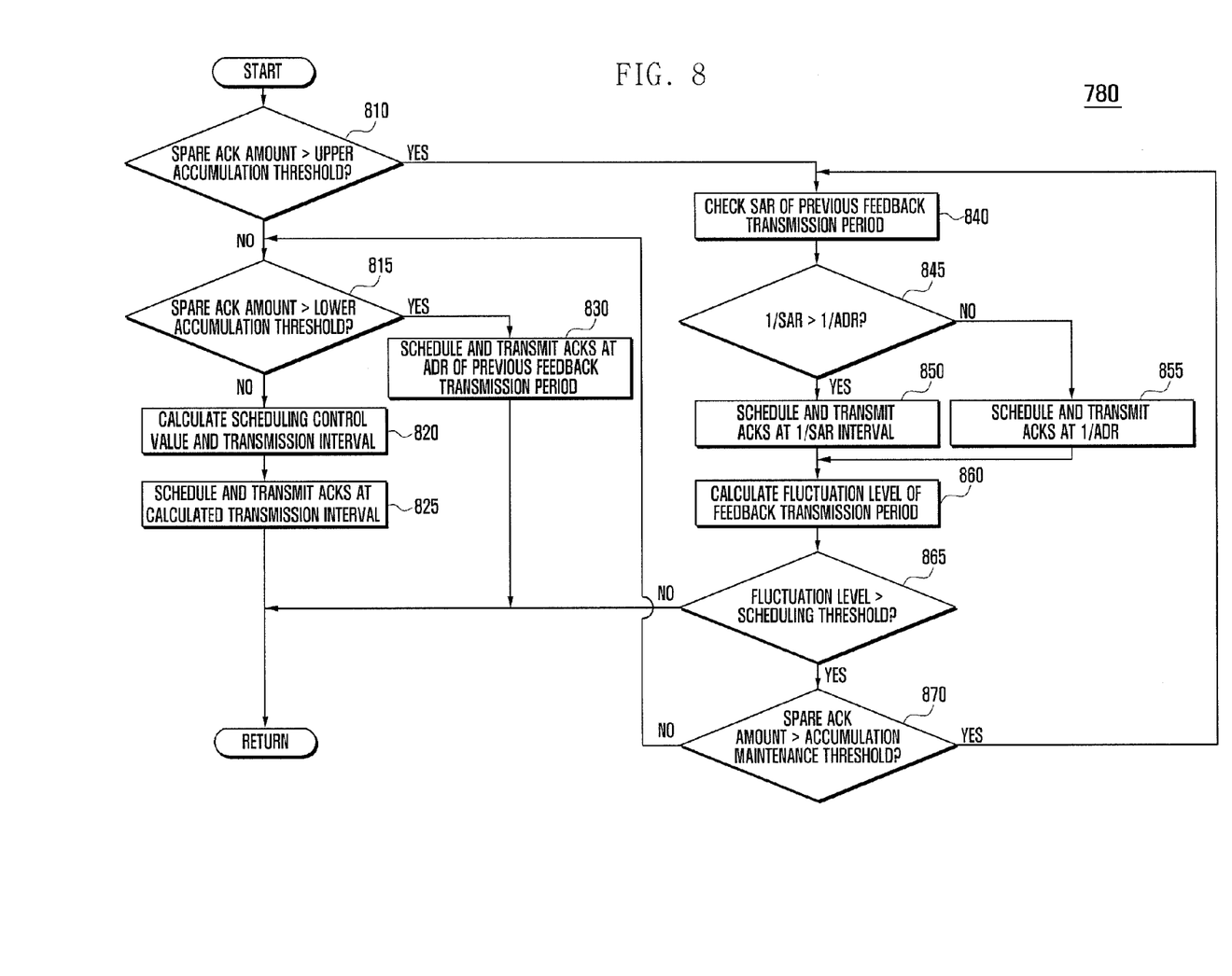
FIG. 8 is a flowchart illustrating a spare ACK accumulation amount-based scheduling procedure of an ACK transmission method according to an exemplary embodiment of the present invention.

FIG. 8 is a flowchart illustrating a spare ACK accumulation amount-based scheduling procedure of an ACK transmission method according to an exemplary embodiment of the present invention.

Referring to FIG. 8, the terminal determines whether the accumulation amount of the spare ACKs is greater than a predetermined upper accumulation threshold at step 810. If the accumulation amount of the spare ACKs is equal to or less than the upper accumulation threshold, the terminal determines whether the accumulation amount of the spare ACKs is greater than a predetermined lower accumulation threshold at step 815.

If the accumulation amount of the spare ACKs is equal to or less than the lower accumulation threshold at step 815, the terminal calculates the scheduling control value (d) and transmission interval again at step 820. Next, the terminal schedules the ACKs at the calculated transmission interval and transmits the ACKs as scheduled at step 825. If the accumulation amount of the spare ACKs is greater than the lower accumulation threshold at step 815, the terminal schedules the ACKs at the same transmission interval as the previous feedback transmission period and transmits the ACKs as scheduled at step 830. At this time, the terminal transmits the ACKs as scheduled at a 1/ADR interval. Through this, the terminal may keep the accumulation amount of the spare ACKs regularly.

Returning to step 810, if the accumulation amount of the spare ACKs is greater than the upper accumulation threshold, the terminal checks the SAR of the previous feedback transmission period at step 840. Next, the terminal determines whether 1/SAR is greater than 1/ADR at step 845. If 1/SAR is greater than 1/ADR, the terminal schedules the ACKs at a 1/SDR interval and transmits the ACKs as scheduled at step 850. Otherwise, if 1/SAR is equal to or less than 1/ADR, the terminal schedules the ACKs at the 1/ADR interval and transmits the ACKs as scheduled at step 855.

If the second feedback transmission period arrives, the terminal calculates the fluctuation level of the second feedback transmission period at step 860. That is, the terminal checks the segment transmission amount information of the second feedback transmission period and calculates the segment transmission amount change rate based on the segment transmission amount information. The terminal calculates the fluctuation level at the third feedback transmission time point using the segment transmission amount change rate. Next, the terminal determines whether the calculated fluctuation level is greater than the scheduling threshold at step 865. If the fluctuation level is greater than the threshold value, the terminal determines whether the accumulation amount of the spare ACKs is greater than the accumulation maintenance threshold at step 870.

If the accumulation amount of the spare ACKs is greater than the maintenance threshold, the terminal returns the procedure to step 840 to perform the spare ACK consumption process. Otherwise, if the accumulation amount of the spare ACKs is equal to or less than the accumulation maintenance threshold, the terminal returns the procedure to step 815 to maintain the accumulation amount of the spare ACKs or accumulation process.

As described above, the ACK transmission method and apparatus of exemplary embodiments of the present invention are capable of reducing the probability of the occurrence of a spurious timeout, at the TCP sender, caused by radio channel variation and scheduling delay. Also, the ACK transmission method and apparatus of exemplary embodiments of the present invention are capable of securing a long RTO in view of the sender so as to tolerate the long RTT as compared to the wired network environment and scheduling ACKs at a regular transmission interval in view of the receiver regardless of the actual data arrival interval. Furthermore, the ACK transmission method and apparatus of exemplary embodiments of the present invention are capable of addressing the delay spike and high RTT variance problems that frequently occur in the wireless communication environment.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A resource scheduling method of a terminal, the method comprising:
    receiving, by the terminal, at least one segment from a base station during a predetermined transmission period;
    identifying, by the terminal, a fluctuation level based on a variation of an amount of the received at least one segment received at the predetermined transmission period;
    determining, by the terminal, when a number of accumulated acknowledgements (ACKs) at the terminal is less than a predetermined lower accumulation threshold, a delay value based on the fluctuation level;
    determining, when the number of accumulated ACKs at the terminal is greater than a predetermined upper accumulation threshold, the delay value based on a segment arrival rate of a previous transmission period;
    calculating a transmission interval of an ACK corresponding to one or more segments to be received in a next feedback transmission period based on the delay value;
    accumulating an ACK as a spare ACK based on the calculated transmission interval of the corresponding ACK; and
    transmitting, when the fluctuation level is greater than a predetermined threshold, at least one ACK corresponding to the received at least one segment based on the delay value.

2. The method of claim 1, further comprising:
    calculating, when a next feedback transmission period arrives, the fluctuation level of the corresponding feedback transmission period;
    comparing the fluctuation level with a scheduling threshold value;
    determining, when the fluctuation level is greater than the scheduling threshold value, whether the accumulation amount of the spare ACK is greater than an accumulation maintenance threshold; and
    accumulating the spare ACK according to a result of the determination of whether the accumulation amount of the spare ACK is greater than the accumulation maintenance threshold.

3. A terminal for scheduling a resource, the terminal comprising:
    a transceiver configured to transmit and receive a signal; and
    a controller including at least one processor configured to:
        control the transceiver to receive at least one segment from a base station during a predetermined transmission period,
        identify a fluctuation level based on a variation of an amount of the received at least one segment received at the predetermined transmission period,
        determine, when a number of accumulated acknowledgements (ACKs) at the terminal is less than a predetermined lower accumulation threshold, a delay value based on the fluctuation level,
        determine, when the number of accumulated ACKs at the terminal is greater than a predetermined upper accumulation threshold, the delay value based a segment arrival rate of a previous transmission period;
        calculate a transmission interval of an ACK corresponding to one or more segments to be received in a next feedback transmission period based on the delay value,
        accumulate an ACK as a spare ACK based on the calculated transmission interval of the corresponding ACK, and
        transmit, when the fluctuation level is greater than a predetermined threshold, at least one ACK corresponding to the received at least one segment based on the delay value.

4. The terminal of claim 3, wherein the controller is further configured to:
    calculate, when a next feedback transmission period arrives, the fluctuation level of a corresponding feedback transmission period,
    compare the fluctuation level with a scheduling threshold value,
    determine, when the fluctuation level is greater than the scheduling threshold value, whether the accumulation amount of the spare ACK is greater than an accumulation maintenance threshold, and
    accumulate the spare ACK according to a result of the determination of whether the accumulation amount of the spare ACK is greater than the accumulation maintenance threshold.

* * * * *